(12) United States Patent
Ribu

(10) Patent No.: US 12,540,439 B2
(45) Date of Patent: Feb. 3, 2026

(54) POLYPROPYLENE COATED PAPER AND PAPERBOARD

(71) Applicant: Stora Enso OYJ, Helsinki (FI)

(72) Inventor: Ville Ribu, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 763 days.

(21) Appl. No.: 17/754,900

(22) PCT Filed: Oct. 16, 2020

(86) PCT No.: PCT/IB2020/059759
§ 371 (c)(1),
(2) Date: Apr. 15, 2022

(87) PCT Pub. No.: WO2021/074878
PCT Pub. Date: Apr. 22, 2021

(65) Prior Publication Data
US 2023/0295874 A1    Sep. 21, 2023

(30) Foreign Application Priority Data

Oct. 18, 2019   (SE) .................................. 1951180-7

(51) Int. Cl.
| | | |
|---|---|---|
| *D21H 19/22* | (2006.01) |
| *B32B 27/08* | (2006.01) |
| *B32B 27/10* | (2006.01) |
| *B32B 27/20* | (2006.01) |
| *B32B 27/32* | (2006.01) |
| *B65D 81/34* | (2006.01) |
| *C09D 123/12* | (2006.01) |
| *D21H 19/58* | (2006.01) |
| *D21H 21/34* | (2006.01) |
| *D21H 23/46* | (2006.01) |
| *D21H 27/10* | (2006.01) |
| *B29C 48/154* | (2019.01) |
| *B29K 23/00* | (2006.01) |
| *B29K 711/12* | (2006.01) |

(52) U.S. Cl.
CPC .............. *D21H 19/22* (2013.01); *B32B 27/08* (2013.01); *B32B 27/10* (2013.01); *B32B 27/20* (2013.01); *B32B 27/32* (2013.01); *B65D 81/3453* (2013.01); *C09D 123/12* (2013.01); *D21H 19/58* (2013.01); *D21H 21/34* (2013.01); *D21H 23/46* (2013.01); *D21H 27/10* (2013.01); *B29C 48/154* (2019.02); *B29K 2023/12* (2013.01); *B29K 2711/12* (2013.01); *B32B 2307/306* (2013.01); *B32B 2307/4026* (2013.01); *B32B 2307/718* (2013.01); *B32B 2307/72* (2013.01); *B32B 2307/7246* (2013.01); *B32B 2439/70* (2013.01)

(58) Field of Classification Search
None
See application file for complete search history.

(56) References Cited

U.S. PATENT DOCUMENTS

| | | |
|---|---|---|
| 3,418,396 A | 12/1968 | Edwards et al. |
| 2012/0270959 A1 | 10/2012 | Bernreitner et al. |
| 2013/0123416 A1 | 5/2013 | Klimke et al. |
| 2013/0236668 A1 | 9/2013 | Bernreitner et al. |
| 2017/0058068 A1 | 3/2017 | Lee et al. |
| 2020/0071044 A1 | 3/2020 | Lemme et al. |

FOREIGN PATENT DOCUMENTS

| | | |
|---|---|---|
| CN | 102695747 A | 9/2012 |
| CN | 102869719 A | 1/2013 |
| CN | 102947357 A | 2/2013 |
| CN | 107922706 A | 4/2018 |
| CN | 110035891 A | 7/2019 |
| EP | 0065367 A1 | 11/1982 |
| EP | 0190889 A2 | 8/1986 |
| EP | 1449878 * | 8/2004 |
| EP | 2386584 A1 | 11/2011 |
| EP | 2487203 A1 | 8/2012 |
| JP | 2004017447 A | 1/2004 |
| JP | 2009040460 A | 2/2009 |
| JP | 2014188883 A | 10/2014 |
| JP | 2016199651 A | 12/2016 |
| WO | 0022057 A1 | 4/2000 |
| WO | 2017191535 A1 | 11/2017 |

OTHER PUBLICATIONS

International Search Report from corresponding PCT application No. PCT/IB/2020/059759 mailed on Dec. 3, 2020.
Asahi Kasei Amidas Co., Ltd., Plastic Databook, Plastics Editorial Department, First Edition, First Printing, Japan, published by Kogyo Chosakai Co., Ltd., Dec. 1, 1999, p. 27.
Office Action from corresponding Japanese patent application No. 2022-521746, mailed on Jul. 10, 2024.

* cited by examiner

*Primary Examiner* — Yan Lan
(74) *Attorney, Agent, or Firm* — Greer, Burns & Crain, Ltd.

(57) ABSTRACT

The present invention relates to paper or paperboard comprising cellulose fibers, said paper or paperboard comprising at least one coating layer formed by extrusion coating of a PP (polypropylene) resin, characterized in that the PP resin comprises at least 50% by weight of a branched PP copolymer having a density in the range of 890-910 kg/m³ (as determined according to ISO 1183), a melting temperature in the range of 155-170° C. (as determined according to ISO 11357-3), and a melt flow rate (230° C./2.16 kg) in the range of 10-15 g/10 min (as determined according to ISO 1133), and wherein the PP resin is applied to the paper or paperboard at a grammage of less than 30 g/m².

16 Claims, No Drawings

POLYPROPYLENE COATED PAPER AND PAPERBOARD

This application is a U.S. National Phase under 35 U.S.C. § 371 of International Application No. PCT/IB2020/059759, filed Oct. 16, 2020, which claims priority under 35 U.S.C. §§ 119 and 365 to Swedish Application No. 1951180-7 filed Oct. 18, 2019.

TECHNICAL FIELD

The present disclosure relates to polymer coated paper and paperboard. More specifically, the present disclosure relates to paper or paperboard comprising at least one coating layer formed by extrusion coating of a polypropylene (PP) resin.

BACKGROUND

Coating of paper and paperboard with plastics is often employed to combine the mechanical properties of the paperboard with the barrier and sealing properties of a plastic film. Paperboard provided with even a relatively small amount of a suitable plastic material can provide the properties needed to make the paperboard suitable for many demanding applications.

Extrusion coating is a process by which a molten plastic material is applied to a substrate, such as paper or paperboard to form a very thin, smooth and uniform layer. The coating can be formed by the extruded plastic itself, or the molten plastic can be used as an adhesive to laminate a solid plastic film onto the substrate. Common plastic resins used in extrusion coating include polyethylene (PE), polypropylene (PP), and polyethylene terephthalate (PET).

Paper or paperboard as such is generally suitable for the packaging of dry products. However, untreated paperboard is of limited use in direct contact with moist or greasy products, because moisture will affect the mechanical properties of the packaging, and absorbed grease will cause staining of the paper. These effects will impair the protective function as well as the appearance of the packaging.

Extrusion coating may be used to achieve, e.g., moisture protection, barrier properties for water vapor, oxygen, aromas, etc., dirt or grease resistance, heat sealability, and/or to impart a desired finish or texture to a substrate surface.

Extrusion coating or lamination drastically expands the range applications for paper and paperboard. The thin plastic layer imparts resistance to grease and moisture and also in some instances heat resistance. The plastic coatings can also be used for heat sealing. Depending on the application, the paper or paperboard may be extrusion coated on one or both sides.

One application in which the properties of extrusion coated or laminated paperboard is especially useful is for food containers intended for heating of foodstuff in a microwave oven. In such microwavable packs, the packaging material must be able to resist moisture and grease at elevated temperatures without absorption into the paperboard. The temperatures reached in microwave applications may be high, such as in the range of 150-160° C., and therefore materials having a high melting point and high heat resistance are required.

Polypropylene has been found to have excellent properties for use in microwavable packs, including high grease resistance at elevated temperatures, heat sealability and heat resistance. However, polypropylene suffers from the drawback that it is relatively difficult to process by extrusion coating. For example, polypropylene coatings are prone to pinhole formation and poor substrate adhesion at low coating grammages. In order to improve its processing properties polypropylene for extrusion coating is often mixed with polyethylene.

For environmental and economic reasons, it is generally desirable to keep the plastic coating as thin as possible, as long as the barrier and protective properties are maintained at an acceptable level. Generally, as long as the coating is uniform and free from defects, only a very thin layer is required for providing sufficient barrier and protective properties. In many cases however, further reduction of the thickness (or grammage) of the plastic coating is limited by impaired adhesion and stability of the film formation in the extrusion process, and formation of pinholes. For example, conventional PP resins cannot be extrusion coated on paper or paperboard to a grammage of less than about 30-40 g/m$^2$, without a significant increase of the amount of pinholes formed in the coating. Pinholes are microscopic holes that can form in the plastic film during the coating process. The main reasons for the appearance of pinholes include irregularities in the substrate surface (e.g. high surface roughness or loose fibres), an uneven coating distribution or too low a coating grammage. Pinholes affect the barrier properties of the film, e.g. moisture and $CO_2$ barrier properties, which are important for product safety in high heat end uses i.e. in microwave ovenable applications.

Addition of polyethylene to polypropylene for extrusion coating has not solved the problems with pinhole formation at low coating grammages. Thus, there remains a need for improved solutions for reducing PP coating grammage in extrusion coating of PP, while maintaining good barrier properties.

DESCRIPTION OF THE INVENTION

It an object of the present disclosure to reduce the problem of pinhole formation in extrusion coating of paper and paperboard with PP at low grammages, particularly at grammages of less than 30 g/m$^2$.

It is a further object of the present disclosure to reduce the minimum grammage of a PP resin required to achieve a useful coating, particularly in terms of moisture and $CO_2$ barrier properties, in extrusion coating of paper and paperboard.

It is a further object of the present disclosure to provide a method for manufacturing PP resin coated paper or paperboard, which allows for reduced grammage of the PP resin, such as a grammage of less than 30 g/m$^2$, while maintaining good moisture and $CO_2$ barrier properties.

The above mentioned objects, as well as other objects as will be realized by the skilled person in the light of the present disclosure are achieved by the various aspects of the present disclosure.

According to a first aspect illustrated herein, there is provided a paper or paperboard comprising cellulose fibers, said paper or paperboard comprising at least one coating layer formed by extrusion coating of a PP (polypropylene) resin, characterized in that the PP resin comprises at least 50% by weight of a branched PP copolymer having a density in the range of 890-910 kg/m$^3$ (as determined according to ISO 1183), a melting temperature in the range of 155-170° C. (as determined according to ISO 11357-3), and a melt flow rate (230° C./2.16 kg) in the range of 10-15 g/10 min (as determined according to ISO 1133), and wherein the PP resin is applied to the paper or paperboard at a grammage of less than 30 g/m$^2$.

Paper generally refers to a material manufactured in thin sheets from the pulp of wood or other fibrous substances comprising cellulose fibers, used for writing, drawing, or printing on, or as packaging material.

Paperboard generally refers to strong, thick paper or cardboard comprising cellulose fibers used for boxes and other types of packaging. Paperboard can either be bleached or unbleached, coated or uncoated, and produced in a variety of thicknesses, depending on the end use requirements.

The term coating, as used herein, refers to an operation in which the surface of a substrate is covered with a composition to impart desired properties, finish or texture to the substrate. The coating can be a single or multilayer coating wherein the PP coating resin can be used in one or several layers. The coating can be applied to one side or both sides of the paper or paperboard.

The problems with pinhole formation in PP-coatings at lower grammages is especially pronounced in the coating of paper and paperboard. The fiber based substrate and its natural voids and surface roughness likely plays a significant role here. PP extrusion coatings for paper or paperboard based microwavable food containers today typically require a coating grammage of at least 30-40 g/m$^2$, and typically even higher grammages are used. Lower coating grammages result in a large increase of the number of pinholes in the coatings.

The present inventors have now found that using a specific type of PP resin, the minimum grammage of PP resin required to achieve a pinhole free, or almost pinhole free coating in extrusion coating of paper and paperboard can be significantly reduced.

Reduction of pinhole formation is very important for product safety in high heat end uses i.e. in microwave ovenable applications, in which pinholes as such possess a risk. The inventive solution allows for adjusting moisture and $CO_2$ barrier to sufficient and desired level at lower grammages.

Additionally, the specific type of PP resin used in the present invention has been found to offer further advantages compared to standard extrusion coating grade PP, including improved adhesion to the paper or paperboard substrate at low grammages, better runnability allowing for higher line speed in the extrusion coating process, as well as improved heat sealability.

The PP resin used in the present invention comprises at least comprises at least 50% by weight of a branched PP copolymer having a density in the range of 890-910 kg/m$^3$ (as determined according to ISO 1183), a melting temperature in the range of 155-170° C. (as determined according to ISO 11357-3), and a melt flow rate (230° C./2.16 kg) in the range of 10-15 g/10 min (as determined according to ISO 1133).

The PP copolymer used in the present invention is a branched PP copolymer. Branching can be achieved by using specific catalysts, i.e. specific single-site catalysts, or by chemical modification. A branched polypropylene obtained by chemical modification is referred to as a high melt strength polypropylene. Preferably the branched PP copolymer of the present invention is obtained by chemical modification and thus is a high melt strength polypropylene (HMS-PP).

In some embodiments, the PP copolymer is a long chain branched polypropylene (LCB-PP). Long chain branched polypropylene generally refers to polypropylene modified by the addition of long-chain branches. The modification can be achieved by a range of different methods, e.g. by a reactive extrusion process with the addition of a multifunctional monomer and a peroxide.

In some embodiments, the PP copolymer has a density in the range of 895-905 kg/m$^3$, preferably in the range of 898-902 kg/m$^3$.

In some embodiments, the PP copolymer has a melting temperature in the range of 158-166° C., preferably in the range of 160-164° C.

In some embodiments, the PP copolymer has a melt flow rate (230° C./2.16 kg) in the range of 12-14 g/10 min, preferably about 13 g/10 min.

In some embodiments, the PP copolymer has been subjected to visbreaking. Visbreaking means that the molecular weight of the polypropylene is reduced by mixing the molten polymer in the extruder with a free radical generator, such as a peroxide. Visbreaking is well known to the person skilled in the art documented in the literature.

In a specific embodiment the PP resin used in the present invention comprises at least 50% by weight of a branched PP copolymer having a density in the range of about 900 kg/m$^3$ (as determined according to ISO 1183), a melting temperature in the range of about 162° C. (as determined according to ISO 11357-3), and a melt flow rate (230° C./2.16 kg) in the range of about 13 g/10 min (as determined according to ISO 1133). In a further specific embodiment the PP resin used in the present invention consists, or substantially consists, of a branched PP copolymer having a density in the range of about 900 kg/m$^3$ (as determined according to ISO 1183), a melting temperature in the range of about 162° C. (as determined according to ISO 11357-3), and a melt flow rate (230° C./2.16 kg) in the range of about 13 g/10 min (as determined according to ISO 1133).

One example of a branched PP copolymer having these preferred properties is Daploy™ SF313HMS (Borealis AG). Daploy™ SF313HMS is a polypropylene copolymer with high melt strength, good heat resistance and excellent heat sealing performance.

The branched PP copolymer used in the present invention is generally more expensive than conventional extrusion coating grade polypropylenes. However, since the coating grammage can be significantly reduced, the branched PP copolymer can still provide a cost effective alternative.

The PP resin of the invention comprises at least 50% by weight of the PP copolymer. In some embodiments, the PP resin comprises at least 70% by weight, preferably at least 90% by weight, of the PP copolymer. The PP resin of the invention may also consist, or substantially consist, of the PP copolymer. An embodiment wherein the PP resin consists, or substantially consists, of the PP copolymer is of particular interest since such a monomaterial coating offers obvious recycling advantages.

The remainder of the PP resin can be made up of other polymeric or non-polymeric coating constituents. In other words, the PP resin can be a blend of the PP copolymer and another polymer. In some embodiments, the remainder of the PP resin is comprised of a PP having density outside the range of 890-910 kg/m$^3$ (as determined according to ISO 1183), a melting temperature outside the range of 155-170° C. (as determined according to ISO 11357-3), and a melt flow rate (230° C./2.16 kg) outside the range of 10-15 g/10 min (as determined according to ISO 1133).

For environmental and economic reasons, it is generally desirable to keep the plastic coating as thin as possible, as long as the barrier and protective properties are maintained at an acceptable level. The PP resin used in the present invention allows for the preparation of thin pinhole free PP coatings on paper and paperboard. Particularly, the PP resin used in the present invention allows for the preparation of thin pinhole free PP coatings on paper and paperboard with a coating grammage of less than 30 g/m$^2$. In some embodiments, the PP resin is applied to the substrate at a grammage of less than 28 g/m$^2$, preferably less than 26 g/m$^2$, more preferably less than 24 g/m$^2$.

The formulation of a coating resin may vary greatly depending on the intended use of the coating and the coated paper or paperboard. Coating compositions may include a wide range of ingredients in varying quantities to improve the end performance of the product or processing of the coating. In some embodiments, the PP resin comprises at least one additional component selected from the group consisting of a polymer other than a PP, a pigment, a dye, and a filler.

The paper or paperboard of the present invention may be coated only with the PP resin comprising at least 50% by weight of a branched PP copolymer having a density in the range of 890-910 kg/m$^3$ (as determined according to ISO 1183), a melting temperature in the range of 155-170° C. (as determined according to ISO 11357-3), and a melt flow rate (230° C./2.16 kg) in the range of 10-15 g/10 min (as determined according to ISO 1133). Alternatively, the paper or paperboard of the present invention may include the PP resin coating layer as one of two or more polymeric coating layers. As the PP resin of the invention is capable of providing a thin and pinhole free PP coating on paper or paperboard it may preferably be used as the first (or innermost) coating layer applied directly onto the paper or paperboard surface. The extrusion coated PP resin coating layer may then serve to promote adhesion of subsequently applied or coextruded PP coating layers having a composition different from the first PP resin coating layer.

In some embodiments, the paper or paperboard further comprises at least one additional polymeric coating layer disposed on top of the extrusion coated PP resin, wherein the additional polymeric coating layer has a composition different from the extrusion coated PP resin. In a preferred embodiment, the at least one additional coating layer comprises polypropylene (PP).

In some embodiments, the at least one additional coating layer is formed by extrusion coating or by extrusion film lamination.

The inventive paper or paperboard is particularly useful in the manufacture of heat resistant receptacles, such as food containers or trays. According to a second aspect illustrated herein, there is provided a heat resistant receptacle, preferably a food container for microwave heating, comprising paper or paperboard defined as set out above with reference to the first aspect.

According to a third aspect illustrated herein, there is provided the use of a PP resin comprising at least 50% by weight of a branched PP copolymer having a density in the range of 890-910 kg/m$^3$ (as determined according to ISO 1183), a melting temperature in the range of 155-170° C. (as determined according to ISO 11357-3), and a melt flow rate (230° C./2.16 kg) in the range of 10-15 g/10 min (as determined according to ISO 1133), for coating a paper or paperboard substrate comprising cellulose fibers, wherein the PP resin is applied to the substrate at a grammage of less than 30 g/m$^2$. The present inventors have found that using this specific type of PP resin, the minimum grammage of PP resin required to achieve pinhole free film formation in extrusion coating of paper and paperboard can be significantly reduced.

The PP resin of the third aspect may be further defined as set out above with reference to the first aspect.

According to a fourth aspect illustrated herein, there is provided a method for manufacturing a PP resin coated paper or paperboard substrate comprising cellulose fibers, said method comprising:
a) providing paper or paperboard substrate,
b) applying at least one layer of molten PP resin to a surface of said substrate by extrusion coating,
c) allowing the PP resin to cool down and solidify, and
d) recovering the PP resin coated substrate,
characterized in that the PP resin comprises at least 50% by weight of a branched PP copolymer having a density in the range of 890-910 kg/m$^3$ (as determined according to ISO 1183), a melting temperature in the range of 155-170° C. (as determined according to ISO 11357-3), and a melt flow rate (230° C./2.16 kg) in the range of 10-15 g/10 min (as determined according to ISO 1133), and
wherein the PP resin is applied to the substrate at a grammage of less than 30 g/m$^2$.

The PP resin of the fourth aspect may be further defined as set out above with reference to the first aspect.

The paper or paperboard of the present invention may be coated only with the PP resin comprising at least 50% by weight of a branched PP copolymer having a density in the range of 890-910 kg/m$^3$ (as determined according to ISO 1183), a melting temperature in the range of 155-170° C. (as determined according to ISO 11357-3), and a melt flow rate (230° C./2.16 kg) in the range of 10-15 g/10 min (as determined according to ISO 1133). Alternatively, the paper or paperboard of the present invention may include the PP resin coating layer as one of two or more polymeric coating layers. As the PP resin of the invention is capable of providing a thin and pinhole free PP coating on paper or paperboard it may preferably be used as the first (or innermost) coating layer applied directly onto the paper or paperboard surface. The extrusion coated PP resin coating layer may then serve to promote adhesion of subsequently applied or coextruded PP coating layers having a composition different from the first PP resin coating layers.

In some embodiments, the method further comprises applying at least one additional polymeric coating layer disposed on top of the extrusion coated PP resin, wherein the additional polymeric coating layer has a composition different from the extrusion coated PP resin. In a preferred embodiment, the at least one additional coating layer comprises polypropylene (PP).

In some embodiments, the at least one additional coating layer is formed by extrusion coating or by extrusion film lamination.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

Example—Pinhole Formation as a Function of Coating Grammage for Different PP Grades Paperboard (Cupforma Natura, Stora Enso Oy) having a grammage of 180-190 g/m$^2$ was extrusion coated (one sided coating, top extruder temperature 290-300° C.) with a single layer of polypropylene.

In a first run, the paperboard was coated with a standard extrusion coating grade polypropylene (Std PP). The standard extrusion coating grade polypropylene had a density of 910 kg/m$^3$ (as determined according to ISO 1183), a melting temperature of 161° C. (as determined according to ISO 11357-3), and a melt flow rate (230° C./2.16 kg) of 25 g/10 min (as determined according to ISO 1133).

In a second run, the paperboard was coated with a branched PP copolymer (New PP) having a density of 900 kg/m$^3$ (as determined according to ISO 1183), a melting temperature of 162° C. (as determined according to ISO 11357-3), and a melt flow rate (230° C./2.16 kg) of 13 g/10 min (as determined according to ISO 1133).

For each PP coated paperboard with two different coating weights were prepared, a first coating weight of about 30 g/m$^2$ and a second coating weight of about 20 g/m$^2$.

The four PP coated paperboard samples were analyzed for the presence of pinholes in the PP coatings. Pinhole testing was done by spreading a liquid consisting of 99.5% ethanol dyed with Erythrosin B (10 g/5 l ethanol) on the coated surface, allowing the liquid to dry, and counting the pinholes in a defined area using an optical microscope. Results are obtained as number of pinholes per m$^2$. The results are presented in Table 1. From the measurements, it is evident that using the branched PP copolymer, the pinhole formation can be significantly reduced

TABLE 1

| Sample | Target Coating weight (g/m$^2$) | Measured Coating weight (g/m$^2$) | Pinholes (1/m$^2$) |
|---|---|---|---|
| Std PP | 30 | 30.0 | 170 |
| Std PP | 20 | 22.7 | 395 |
| New PP | 30 | 31.8 | 2 |
| New PP | 20 | 21.0 | 6 |

In addition to the reduced pinhole formation it was also noticed that when using the branched PP copolymer instead of the standard extrusion coating grade PP, the line speed of the extrusion coating line could be significantly increased. Using the branched PP copolymer, the line speed could be increased by at least 30% compared to the standard grade while maintaining an acceptable standard deviation of the coating grammage.

The invention claimed is:

1. A paper or paperboard comprising:
cellulose fibers, and
at least one coating layer formed by extrusion coating of a PP (polypropylene) resin,
wherein the PP resin comprises at least 50% by weight of a branched PP copolymer having a density in a range of 898-902 kg/m$^3$ (as determined according to ISO 1183), a melting temperature in a range of 160-164° C. (as determined according to ISO 11357-3), and a melt flow rate (230° C./2.16 kg) in a range of 10-15 g/10 min (as determined according to ISO 1133),
wherein said PP copolymer has been subjected to visbreaking, and,
wherein the PP resin is applied to the paper or paperboard at a grammage of less than 30 g/m$^2$.

2. The paper or paperboard according to claim 1, wherein said PP copolymer has a melt flow rate (230° C./2.16 kg) in a range of 12-14 g/10 min.

3. The paper or paperboard according to claim 1, wherein said PP copolymer is a long chain branched polypropylene (LCB-PP).

4. The paper or paperboard according to claim 1, wherein said PP resin comprises at least 70% by weight of said PP copolymer.

5. The paper or paperboard according to claim 1, wherein the PP resin further comprises a PP having a density outside the range of 898-902 kg/m$^3$ (as determined according to ISO 1183), a melting temperature outside the range of 160-164° C. (as determined according to ISO 11357-3), and a melt flow rate (230° C./2.16 kg) outside the range of 10-15 g/10 min (as determined according to ISO 1133).

6. The paper or paperboard according to claim 1, wherein the PP resin is applied to the substrate at a grammage of less than 28 g/m$^2$.

7. The paper or paperboard according to claim 1, wherein the PP resin comprises at least one additional component selected from a group consisting of: a polymer other than a PP, a pigment, a dye, and a filler.

8. The paper or paperboard according to claim 1, further comprising: at least one additional polymeric coating layer disposed on top of the extrusion coated PP resin, wherein the additional polymeric coating layer has a composition different from the extrusion coated PP resin.

9. The paper or paperboard according to claim 8, wherein said at least one additional coating layer comprises polypropylene (PP).

10. The paper or paperboard according to claim 8, wherein said at least one additional coating layer is formed by extrusion coating or by extrusion film lamination.

11. A heat resistant receptacle comprising: the paper or paperboard according to claim 1.

12. A method for manufacturing a PP resin coated paper or paperboard substrate comprising cellulose fibers, said method comprising:
a) providing paper or paperboard substrate,
b) applying at least one layer of a molten PP resin to a surface of said substrate by extrusion coating,
c) allowing the molten PP resin to cool down and solidify, and
d) recovering the PP resin coated substrate,
wherein the PP resin comprises at least 50% by weight of a branched PP copolymer having a density in a range of 890-910 kg/m$^3$ (as determined according to ISO 1183), a melting temperature in a range of 155-170° C. (as determined according to ISO 11357-3), and a melt flow rate (230° C./2.16 kg) in a range of 10-15 g/10 min (as determined according to ISO 1133),
wherein said PP copolymer has been subjected to visbreaking, and
wherein the PP resin is applied to the substrate at a grammage of less than 30 g/m$^2$.

13. The method according to claim 12, wherein the PP copolymer has a density in a range of 895-905 kg/m$^3$; or
the PP copolymer has a melting temperature in a range of 158-166° C.; or
the PP copolymer has a melt flow rate (230° C./2.16 kg) in a range of 12-14 g/10 min; or
the PP copolymer is a long chain branched polypropylene (LCB-PP); or,
the PP resin comprises at least 70% by weight of said PP copolymer; or
the PP resin further comprises a PP having a density outside the range of 890-910 kg/m$^3$ (as determined according to ISO 1183), a melting temperature outside the range of 155-170° C. (as determined according to ISO 11357-3), and a melt flow rate (230° C./2.16 kg) outside the range of 10-15 g/10 min (as determined according to ISO 1133); or the PP resin is applied to the substrate at a grammage of less than 28 g/m²; or the PP resin comprises at least one additional component selected from a group consisting of: a polymer other than a PP, a pigment, a dye, and a filler;

a combination thereof.

14. The method according to claim 12, further comprising:

applying at least one additional polymeric coating layer on top of the extrusion coated PP resin, wherein the additional polymeric coating layer has a composition different from the extrusion coated PP resin.

15. The method according to claim 14, wherein said at least one additional coating layer comprises polypropylene (PP).

16. The method according to claim 14, wherein said at least one additional coating layer is formed by extrusion coating or by extrusion film lamination.

* * * * *